United States Patent
Yoshida et al.

(10) Patent No.: US 10,997,056 B1
(45) Date of Patent: May 4, 2021

(54) GENERATION OF EXPLANATORY AND EXECUTABLE REPAIR EXAMPLES

(71) Applicant: FUJITSU LIMITED, Kawasaki (JP)

(72) Inventors: Hiroaki Yoshida, Cupertino, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 16/597,646

(22) Filed: Oct. 9, 2019

(51) Int. Cl.
G06F 9/44 (2018.01)
G06F 11/36 (2006.01)
G06F 8/70 (2018.01)
G06F 8/40 (2018.01)

(52) U.S. Cl.
CPC ............ G06F 11/3624 (2013.01); G06F 8/40 (2013.01); G06F 8/70 (2013.01)

(58) Field of Classification Search
None
See application file for complete search history.

(56) References Cited

U.S. PATENT DOCUMENTS

| | | | | |
|---|---|---|---|---|
| 2003/0084434 A1* | 5/2003 | Ren | ........................... | G06F 8/65 717/172 |
| 2004/0230828 A1* | 11/2004 | DeFuria | .................... | G06F 8/65 713/191 |
| 2005/0124332 A1* | 6/2005 | Clark | ................ | H04M 1/72525 455/419 |
| 2012/0192172 A1* | 7/2012 | Hansmann | .......... | G06F 11/3409 717/168 |
| 2015/0149392 A1* | 5/2015 | Bolich | .................... | G06Q 10/20 706/11 |
| 2016/0064204 A1* | 3/2016 | Greenberg | .............. | H01J 61/52 315/113 |
| 2016/0253471 A1* | 9/2016 | Volpe | .................... | G06F 9/4401 607/5 |

OTHER PUBLICATIONS

A. Zeller, "Yesterday, my program word. Today it does not. Why?," FSE-7, Sep. 1999.
G. Misherghi, Z. Su, "HDD: Hierarchical Delta Debugging," ICSE '06, May 20, 2006.

(Continued)

*Primary Examiner* — Anna C Deng
(74) *Attorney, Agent, or Firm* — Maschoff Brennan

(57) ABSTRACT

A method may include obtaining a first violation in a first portion of a first software program and obtaining a first proposed patch to remediate the first violation. The method may include identifying a second software program with a second portion that includes a second violation. The method may include simplifying the second portion of the second software program by removing one or more elements in the second portion that are identified as extraneous. The method may include applying the first proposed patch for the first violation to the simplified second portion to generate a repaired simplified second portion. The method may include obtaining an executable repaired simplified second portion from the repaired simplified second portion. The method may include presenting the second violation and the executable repaired simplified second portion as an example of how the first proposed patch would affect the first violation and the first software program.

19 Claims, 7 Drawing Sheets

(56) References Cited

OTHER PUBLICATIONS

B. Vasilescu et al., "Recovering Clear, Natural Identifiers from Obfuscated JS Names," ESEC/FSE '17; Sep. 2017.
U.S. Appl. No. 16/270,509, filed Feb. 7, 2019.
U.S. Appl. No. 16/270,518, filed Feb. 7, 2019.
U.S. Appl. No. 16/109,434, filed Aug. 22, 2018.
U.S. Appl. No. 16/447,535, filed Jun. 20, 2019.

* cited by examiner

```
class TtlMapState<K, N, UK, UV> {
  // Other method definitions are omitted
  @Override
  public void putAll(Map<UK, UV> map) throws Exception {
    if (map == null) {
      return;
    }
    Map<UK, TtlValue<IV>> ttlMap = new HashMap<>(map.size());
    for (UK key : map.keySet()) {
      ttlmap.put(key, wrapWithTs(map.get(key)));
    }
    original.putAll (ttlMap);
  }
}
```

*FIG. 2A*

```
class TtlMapState<K, N, UK, UV> {
  // Other method definitions are omitted
  @Override
  public void putAll(Map<UK, UV> map) throws Exception {
    if (map == null) {
      return;
    }
    Map<UK, TtlValue<IV>> ttlMap = new HashMap<>(map.size());
    for (Map.Entry<UK, UV> entry : map.entrySet()) {
      UK key = entry.getKey();
      ttlmap.put(key, wrapWithTs(entry.getValue()));
    }
    original.putAll (ttlMap);
  }
}
```

*FIG. 2B*

```
class TtlMapState<K, N, UK, UV> {
  // Other method definitions are omitted
  @Override
  public void putAll(Map<UK, UV> map) throws Exception {
    if (map == null) {
      return;
    }
    Map<UK, TtlValue<IV>> ttlMap = new HashMap<>(map.size());
    for (UK key : map.keySet()) {
      methodStub1 (key, wrapWithTs(map.get(key)));
    }
    original.putAll (ttlMap);
  }
  public void methodStub1 (UK uk1, UV uv1) {
    // Method stub
  }
}
```

*FIG. 2C*

```
class TtlMapState<K, N, UK, UV> {
  // Other method definitions are omitted
  @Override
  public void putAll(Map<UK, UV> map) throws Exception {
    if (map == null) {
      return;
    }
    Map<UK, TtlValue<IV>> ttlMap = new HashMap<>(map.size());
    for (Map.Entry<UK, UV> entry : map.entrySet()) {
      UK key = entry.getKey();
      methodStub1 (key, wrapWithTs(entry.getValue()));
    }
    original.putAll (ttlMap);
  }
  public void methodStub1 (UK uk1, UV uv1) {
    // Method stub
  }
}
```

*FIG. 2D*

```
class Example {
  public void example(Map<Object, Object> map) {
    for (Object key : map.keySet()) {
⚠     doSomething(key, map.get(key));
    }
  }
  public void doSomething(Object object1, Object object2) {
    // Do something
  }
}
```

*FIG. 2E*

```
class Example {
  public void example(Map<Object, Object> map) {
    for (Map.Entry<Object, Object> entry : map.entrySet()) {
      Object key = entry.getKey();
      doSomething (key, entry.getValue());
    }
  }
  public void doSomething(Object object1, Object object2) {
    // Do something
  }
}
```

GENERATION OF EXPLANATORY AND EXECUTABLE REPAIR EXAMPLES

FIELD

The embodiments discussed in the present disclosure are related to generating explanatory and executable repair examples.

BACKGROUND

Software programs often have errors in them (commonly referred to as "bugs" or "violations") and the software programs thus may not operate as intended. Often automated repair systems are used in an attempt to identify and correct errors in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

A method may include obtaining a first violation in a first portion of a first software program and obtaining a first proposed patch to remediate the first violation. The method may also include identifying a second software program with a second portion that includes a second violation. The second software program may be identified in response to a determination that the second violation is similar to the first violation. The first proposed patch may remediate the second violation. The method may further include simplifying the second portion of the second software program by removing one or more elements in the second portion that are identified as extraneous. The method may also include applying the first proposed patch for the first violation to the simplified second portion to generate a repaired simplified second portion. The method may further include obtaining an executable repaired simplified second portion from the repaired simplified second portion. The method may also include presenting the second violation and the executable repaired simplified second portion as an example of how the first proposed patch would affect the first violation and the first software program.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 2A-2F illustrate a process of simplifying a software program;

DESCRIPTION OF EMBODIMENTS

Figure 1:
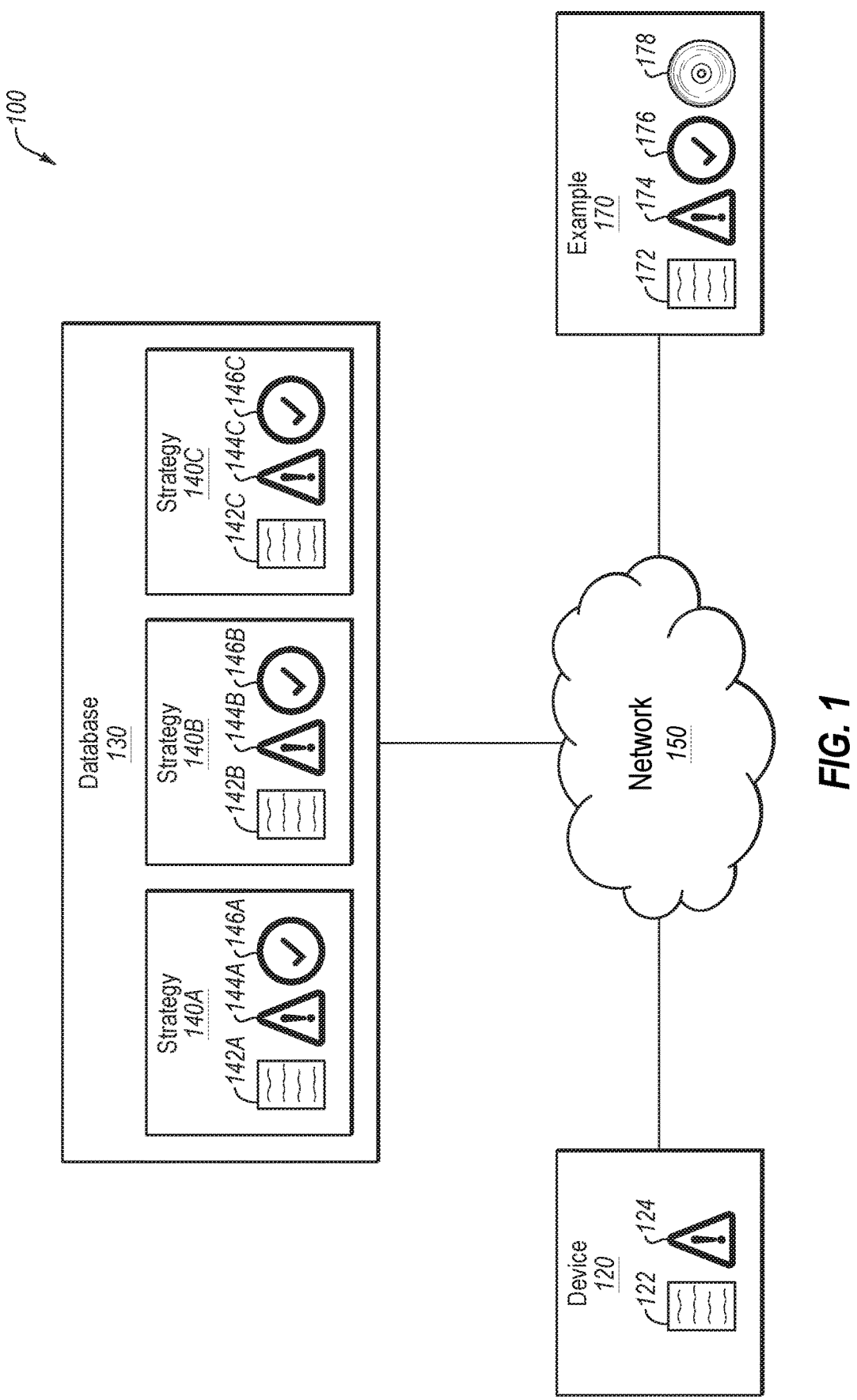
FIG. 1 is a diagram representing an example environment related to generating explanatory and executable repair examples.

Some embodiments described in the present disclosure relate to methods and systems of repairing software programs. Software programs often include errors (also commonly referred to as "bugs" or "violations") that may cause the software program to behave in an unintended manner. Additionally, automated repair systems and techniques are often used to detect and correct errors to repair software programs.

In some embodiments, repositories of existing software programs may be used to identify patterns in the corresponding code that may be used to identify and/or correct errors in code that is being developed or tested. In some instances, the repositories of existing software programs may include source code of a large number of software programs (e.g., thousands, tens of thousands, hundreds of thousands, millions, etc. of software programs). For example, methods of collecting a repository of software programs and repairs for the software programs are described in U.S. patent application Ser. No. 16/270,509 filed on Feb. 7, 2019 and U.S. patent application Ser. No. 16/270,518 filed on Feb. 7, 2019, which are both incorporated by reference herein in their entireties.

In the present disclosure, existing software programs and the corresponding source code that are stored in such repositories and that may be used to help develop other software programs may be referred to as "big code." In some instances, repair strategies may be learned from the repository of software programs. Repair strategies may also be refined and then applied to a newly-discovered violation as described in U.S. patent application Ser. No. 16/109,434 filed on Aug. 22, 2018 and U.S. patent application Ser. No. 16/447,535 filed on Jun. 20, 2019, which are both incorporated by reference herein in their entireties. For example, using a big code repository, potential repair strategies for a software program in development may be identified.

During the development of a software program, one or more violations of the software program may be identified. In these or other embodiments, a development tool may identify and present to a user one or more potential repair strategies or patches to remediate the violations. However, a user may be hesitant to adopt an automatically-generated fix for a software program. In particular, the user may not understand what issue the patch is designed to fix, what changes the patch may make to the software program, or how the patch may address the violation. Thus, while existing methods may present a user with a patch to remediate a violation, the user may not trust the patch and may instead seek out alternative solutions to the violation.

According to one or more embodiments of the present disclosure, the technological field of software development may be improved by configuring a computer system in a manner in which the computing system is able to identify a violation in a software program, identify and suggest a patch to remediate the violation, identify a second software program that has a violation of the same or similar type and is remediated by the suggested patch, simplify the second software program, and present the simplified second software program in an executable form for a user as an example of using the suggested patch.

When referring to a patch that may remediate two different software programs, the software code used to implement the patch for the two software programs may be different but the type of operations performed and the manner in which the patch modifies the two software programs may be similar or the same. For example, when describing a patch remediating two different software programs, the patch may include a first set of operations that may remediate the first software program and may include a second set of operations that are of the same type as the first set of operations and may remediate the second software program. Alternatively, a patch may refer to a sequence of operations to remediate a violation and may not include the precise software code to remediate each software program.

The computing system may be configured to identify a violation in a software program. The computing system may then compare the violation with violations associated with software programs in a repository. The computing system may then identify a patch for the violation based on patches in the repository. The computing system may then identify a second software program that has a violation of the same or similar type and that is remediated by the patch. The computing system may then simplify the second software program and create an executable program from the simplified second software program. The computing system may then present the simplified second software program, the patch, and the executable simplified second software program on a display as an example of using the patch so that a user may perform repair operations on the software program based on the patch.

In some embodiments, the system may facilitate the development of software programming by finding patches for violations in a software program and presenting the patches in an example format, which may result in a user accepting the patch rather than seeking an independent solution to the violation. This may facilitate quicker resolution of violations than a user could perform on his or her own. The improved speed in remediating a software violation may help facilitate the development and testing of source code. In these and other embodiments, a user may more efficiently develop code by focusing on writing the code instead of bug-fixing, which may often occupy a large fraction of a user's time.

Alternatively or additionally, the system may identify more accurate and/or more relevant patches for the software program than a user may identify. The identification of more accurate and/or more relevant patches may help a user write more efficient code or code that operates in a manner intended by a user. The improved identification of patches for a software program and presentation of patches in an example format may thus facilitate the correction of the violation and consequently may help improve the particular source code.

According to one or more embodiments of the present disclosure, the technological field of software development may be improved by configuring a computer system in a manner in which the computing system is able to identify a violation in a software program, identify a patch to remediate the violation, identify a second software program that has a violation that is of the same or similar type and is remediated by the patch, simplify the second software program, and present the simplified second software program as an example of the patch.

Embodiments of the present disclosure are explained with reference to the accompanying drawings.

FIG. 1 is a diagram representing an example environment 100 related to generation of explanatory and executable repair examples, arranged in accordance with at least one embodiment described in the present disclosure. The environment 100 may include a device 120, a database 130, a network 150, and an example 170.

The device 120 may include a computer-based hardware device that includes a processor, memory, and communication capabilities. The device 120 may be coupled to the network 150 to communicate data with any of the other components of the environment 100. Some examples of the device 120 may include a mobile phone, a smartphone, a tablet computer, a laptop computer, a desktop computer, a set-top box, a virtual-reality device, or a connected device, etc. The device 120 may include a processor-based computing device. For example, the device 120 may include a hardware server or another processor-based computing device configured to function as a server. The device 120 may include memory and network communication capabilities.

In some embodiments, the device 120 may include a software program 122. In these and other embodiments, the software program 122 may include source code written in any programming language such as, for example, C++, C, assembly, C #, Java, BASIC, JavaScript, Python, and SQL, among others. In some embodiments, the software program 122 may include multiple methods. In these and other embodiments, a method may be a discrete sub-program inside the software program 122 which may be independently executable and/or distinct. For example, a method may be a sub-unit of the software program 122. In these and other embodiments, the software program 122 may be designed for a particular purpose and/or to achieve a particular goal.

In some embodiments, the software program 122 may include a violation 124. While a single violation 124 is depicted in FIG. 1, the software program 122 may include multiple violations 124. In some embodiments, the violation 124 may include run-time errors, logic errors, and/or other errors. For example, in some embodiments, the violation 124 may include a run-time error. In these and other embodiments, the software program 122 may compile without any errors but errors may be encountered when attempting to execute the compiled software program 122. For example, the software program 122 may include division by zero or an attempt to access an element of an array that does not exist. Alternatively or additionally, in some embodiments, the violation 124 may include a logic errors. In these and other embodiments, the software program 122 may compile without any errors and no errors may be encountered when attempting to execute the compiled software program 122. However, the software program 122 may not function as anticipated by an author or designer of the software program 122.

In some embodiments, the violation 124 may be stored and/or represented in a computer storage by being uniquely specified by a type and a location of the violation 124 in the software program 122. In these and other embodiments, the type and the location of the violation 124 may be determined and/or reported by a software program analysis tool. In some embodiments, the type of the violation 124 may include a category of the violation 124 and may include one of a set of predefined tool-specific types such as "null pointer dereference", "array index is out of bounds", or "an infinite loop". In some embodiments, the location of the violation 124 may be specified by a line number, a range of line numbers, or a range of characters in the software program 122, among other specifications.

The database 130 may include storage of software programming strategies. In some embodiments, the database 130 may include one or more websites on the Internet, such as, for example, one or more websites where users may post software programs that include violations and other users may post patches to remediate the violations. In some embodiments, the database 130 may include a repository of software programs (a big code repository) that may be gathered from a variety of different websites, intranet sites, or other sources. In some embodiments, the database 130 may include software programs that include violations and strategies to remediate the violations. While FIG. 1 depicts a single database 130, in some embodiments there may be multiple databases 130.

In some embodiments, the database 130 may include strategies, such as the strategy 140A, the strategy 140B, and the strategy 140C (collectively the strategies 140). While the database 130 is depicted with three strategies 140, in some embodiments, the database 130 may include hundreds of strategies 140, thousands of strategies 140, hundreds of thousands of strategies 140, or any number of strategies 140. In these and other embodiments, the strategies 140 may each be associated with different software programs. For example, the strategy 140A may include a software program 142A, the strategy 140B may include a software program 142B, and the strategy 140C may include a software program 142C (collectively, the software programs 142). In these and other embodiments, the software programs 142 may each differ from each other and may differ from the software program 122. For example, the software programs 142 may each have a different purpose, have a different author, be written in a different programming language, or include different types of violations than the software program 122.

In some embodiments, the software program 142A may include a violation 144A, the software program 142B may include a violation 144B, and the software program 142C may include a violation 144C (collectively the violations 144). In some embodiments, each of the violations 144 may be different types of violations from each other. For example, the violation 144A may be a run-time error, the violation 144B may be a logic error, and the violation 144C may be a different type of error. Alternatively or additionally, in some embodiments, one or more of the violations 144 may be the same type of violation, may be violations of related types, and/or may be similar types of violations. For example, in some embodiments, the violation 144A may be an index out of bounds violation in the C++ programming language while the violation 144C may be an index out of bounds violation in the Java programming language. In this example, the violation 144A and the violation 144C may be similar violations. In some embodiments, violations 144 may be determined to be similar violations even if the violations are manifested and/or handled differently in different environments. For example, an array index out of bounds access may be manifested and handled differently during runtime in a C++ environment verses a Java environment, even though the root cause of the behavior may be the same, i.e. attempting to access an array out of its prescribed bound of indices.

In some embodiments, the violations 144 may be represented and/or specified in a computer storage and/or memory in a manner similar to the violation 124 discussed above. For example, each of the violations 144 may include a type and a location of the violations 144 in the corresponding software programs 142.

In some embodiments, one or more of the posts 140 may include a patch. For example, the post 140A may include a patch 146A, the post 140B may include a patch 146B, and the post 140C may include a patch 146C (collectively the patches 146). In some embodiments, the patches 146 may represent a method to remediate the corresponding violations 144, e.g. the patch 146A may remediate the violation 144A such that, after applying the patch 146A to the software program 142A, the software program 142A no longer has the violation 144A. In some embodiments, the patches 146 may include source code that may be applied to a source of the violations 144 in the software programs 142. Alternatively or additionally, in some embodiments, the patches 146 may represent the corresponding source code 142 without the corresponding violation 144. For example, in some embodiments, the software program 142A may be a software program with a particular violation, the violation 144A. The patch 146A may be the software program 142A repaired such that it no longer has the violation 144A.

The network 150 may include any communication network configured for communication of signals between any of the components (e.g., the device 120 and the database 130) of the environment 100. The network 150 may be wired or wireless. The network 150 may have numerous configurations including a star configuration, a token ring configuration, or another suitable configuration. Furthermore, the network 150 may include a local area network (LAN), a wide area network (WAN) (e.g., the Internet), and/or other interconnected data paths across which multiple devices may communicate. In some embodiments, the network 150 may include a peer-to-peer network. The network 150 may also be coupled to or include portions of a telecommunications network that may enable communication of data in a variety of different communication protocols.

In some embodiments, the network 150 includes or is configured to include a BLUETOOTH® communication network, a Z-Wave® communication network, an Insteon® communication network, an EnOcean® communication network, a wireless fidelity (Wi-Fi) communication network, a ZigBee communication network, a HomePlug communication network, a Power-line Communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 150 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the device 120, the website 130, a cloud server communication, or a gateway.

The example 170 may include a software program 172, a violation 174, a patch 176, and an executable software program 178. In some embodiments, the software program 172 may be different from the software program 122. In these and other embodiments, the software program 172 may be based on one of the software programs 142. For example, in some embodiments, the software program 172 may be a portion of one of the software programs 142. For example, the software program 172 may be a method of one of the software programs 142 that includes a violation. Alternatively or additionally, the software program 172 may be a simplified version of one of the software programs 142.

In some embodiments, the software program 172 may include a violation 174. In some embodiments, the violation 174 may be similar, related, and/or identical to the violation 124. In some embodiments, the violation 174 may also be similar, related, and/or identical to a violation 144 associated with one or more of the strategies 140 in the database 130. In some embodiments, the violation 174 may be determined to be similar, related, and/or identical to the violation 124 based on the violation 174 and the violation 124 being the same type of violation. For example, both the violation 174 and the violation 124 may be run-time violations that are out-of-bounds violations. In some embodiments, the violation 174 and the violation 124 may be determined to be similar violations based on semantic and/or syntactic code comparison. In some embodiments, based on a run-time error report, an error type, and/or an error characterization of the violation 174 and the violation 124. The violation 174 may be determined to be similar, related, and/or identical to one of the violations 144 in a similar manner.

The patch 176 may represent a method to remediate the violation 174, e.g., the patch 176 may remediate the violation 174 such that, after applying the patch 176 to the software program 172, the software program 172 no longer has the violation 174. In some embodiments, the patch 176 may include source code that may be applied to a source of the violation 174 in the software program 172. Alternatively or additionally, in some embodiments, the patch 176 may represent the corresponding source code 172 without the violation 174. For example, in some embodiments, the software program 172 may be a software program with a particular violation, the violation 174. The patch 176 may be the software program 172 repaired such that it no longer has the violation 174.

In some embodiments, the executable software program 178 may include an executable version of the software program 172 and/or the patch 176. For example, the executable software program 178 may be an executable version of the software program 172 after remediation of the violation 174.

A description of the operation of environment 100 follows. A user may write a software program 122 using the device 120. While writing the software program 122 or while testing the software program 122, the user may receive a notification of a violation 124. The device 120 may then perform a search of a database 130 to identify a patch to remediate the violation 124. The database 130 may be generated and/or collected as described in U.S. patent application Ser. No. 16/270,509 and U.S. patent application Ser. No. 16/270,518. For example, the database may be collected by crawling a variety of different websites and/or code repositories. The device 120 may perform the search to identify the patch and refine the patch as described in U.S. patent application Ser. No. 16/109,434 and U.S. patent application Ser. No. 16/447,535.

The device 120 may select an example 170 from the database 130. For example, the device 120 select as the example 170 a particular strategy of the strategies 140 corresponding with the violation 124 and/or corresponding with the identified patch to remediate the violation 124. The example 170 may include a software program 172, which may be a portion of a software program associated with one of the strategies 140. The device 120 may then simplify the software program 172. In some embodiments, the device 120 may simplify the software program 172 by removing one or more extraneous elements from the software program 172. The elements may include, for example, lines of code, function calls, objects, classes, and references, among other things. An element in the source code may be determined to be extraneous if, after its removal, the software program 172 still has the violation 174 and the software program 172 is still remediated by the patch 176.

To identify extraneous elements in the software program 172, the device 120 may select a particular element in the software program 172. The device 120 may then perform a transformation on the particular element. A transformation may be a modification of elements of the software program. Transformations may include deleting elements of the software program, adding elements to the software program, and/or changing elements in the software program. The transformation may include, for example, transformations of class definitions such as removing a class definition or removing a declaration or an annotation in a class; transformations of method definitions such as removing a method definition or removing a parameter, a declaration, or an annotation in a method; transformations of statements such as removing a statement, replacing a method call with a stub method, or removing a loop or conditional statement while keeping the body; or transformations of expressions such as replacing an expression with a constant or removing a term from an expression. Alternatively or additionally, the transformations may include normalizing types and identifiers such as replacing a type with a generic type or a super type; replacing a variable name with a name derived from the variable's type; replacing a class or method name with a generic name; and generating a generic name for a stub class and/or method. The device 120 may then determine whether the software program 172 with the transformed element includes the violation 174. If the software program 172 retains the violation 174, the device 120 may determine whether the patch remediates the software program 172 with the transformed element. If the patch still remediates the software program 172, the transformation may be accepted as a simplification of the software program 172. If either the software program 172 no longer has the violation 174 or the patch no longer remediates the violation 174, the device 120 may reject the transformation as a simplification of the software program 172 and may proceed to a successive transformation and/or element.

After generating a simplified software program 172, the device 120 may obtain an executable software program 178 based on the simplified software program 172 with the patch 176 applied. In some embodiments, the simplified software program 172, the violation 174, the patch 176, and/or the executable software program 178 may be presented to a user via a display. For example, the simplified software program 172, the violation 174, the patch 176, and/or the executable software program 178 may be presented to the user via a display on the device 120. The presentation may be an example of how the patch may impact the functioning of the software program 122. In some embodiments, the user may use the device 120 to view the patch, to view the simplified software program 172, and to execute the executable software program 178 to see how the patch would impact the software program 122. In some embodiments, the user may use the device 120 to implement the patch to repair the violation 124 in the software program 122. Alternatively or additionally, in some embodiments, the device 120 may implement the identified patch as a repair operation on the software program 122.

Alternatively or additionally, in some embodiments, the device 120 may not simplify the software program 172. In these and other embodiments, the device 120 may obtain an executable software program 178. In these and other embodiments, the software program 172, the violation 174, the patch 176, and/or the executable software program 178 may be presented to a user via a display.

Modifications, additions, or omissions may be made to FIG. 1 without departing from the scope of the present disclosure. For example, the environment 100 may include more or fewer elements than those illustrated and described in the present disclosure. Moreover, in some embodiments, the software program 122 may be created and edited using a device different from the device 120. For example, in these and other embodiments, the user may use one device to create and/or edit the software program 122 and the device 120 may identify a patch using the database 130, simplify the software program 172, and/or present the simplified software program 172, the violation 174, the patch 176, and/or the executable software program 178.

Alternatively or additionally, in some embodiments, the device 120 and the operations discussed relative to the device 120 may be distributed across different systems. In these and other embodiments, the environment 100 may include the network 150 and one or more devices including the device 120 and the database 130 which may be communicatively coupled via the network 150.

FIGS. 2A-2F illustrate a process of simplifying a software program. FIG. 2A depicts a software program 210. The software program 210 may represent a software program prior to simplification. For example, the software program 210 may represent one or more of the software programs 142A, 142B, and/or 142C. In some embodiments, the software program 210 may include many lines, which may include function calls, method calls, class declarations, variable declarations, methods, objects, conditional statements, loops, input/output statements, comments, etc. For example, the software program 210 includes a comment line "//Other method definitions are omitted", a conditional statement "if (map==null)", and a loop "for (UK key: map.keySet( ))", among other elements. The software program 210 may also include code that is part of a class, code that is part of a method, and different method calls. In some embodiments, the software program 210 may include a violation, depicted as a black triangle with a white exclamation point. In the software program 210, the violation may be associated with the line "ttlmap.put(key, wrapWithTs(map.get(key)));". The violation may be remediated by a particular patch. The software program 210 may include one or more extraneous elements. The extraneous elements may include elements that may be removed from the software program 210 such that the software program 210 still includes the violation and may still be remediated by the particular patch.

FIG. 2B depicts a software program 220. The software program 220 may be the software program 210 after application of a patch, such as one of the patches 146. In FIG. 2B, the patch is depicted as hashed text. After application of the patch, the software program 220 may no longer include the violation that is present in the software program 210 of FIG. 2A. The software program 210 of FIG. 2A and the software program 220 of FIG. 2B may represent a software program and a corresponding patch prior to simplification of the software program. For example, the software program 210 of FIG. 2A may be the software program 142A of FIG. 1 and the software program 220 of FIG. 2B may be the patch 146A of FIG. 1.

FIG. 2C depicts a software program 230 as it may appear during a simplification process. A device, such as the device 120 of FIG. 1, may simplify the software program 210 of FIG. 2A. To simplify the software program 210, the device may identify one or more extraneous elements of the software program 210. Extraneous elements are depicted as text with a strikethrough in FIG. 2C. For example, as depicted in FIG. 2C, the comment line of the software program 210 may be determined to be extraneous. The device may determine the comment line is extraneous because the software program 210 still includes the violation after deletion of the comment line and the patch still remediates the violation after deletion of the comment line.

Alternatively or additionally, the device may determine the conditional statement is an extraneous element, one or more lines of code are extraneous elements, and/or one or more parts of lines of code are extraneous elements. For example, the device may determine the "wrapWithTS" function call is an extraneous element within a line of code and may delete call from the line. Alternatively or additionally, the device may generate stub methods and/or stub classes for one or more elements. For example, the device may replace the method call "ttlmap.put" with a method stub, "methodStub1" and may generate a stub method that includes the same inputs and outputs as the replaced method call but may not perform any calculations.

While performing simplifications of the software program 210 to obtain the software program 230, the device may periodically verify that the software program 210 with the simplifications still has the violation and that the violation is remediated by the patch. For example, in some embodiments, the device may perform the verification after every transformation of every element. In some embodiments, the device may discard transformations of elements if, after the transformation, the software program no longer includes the violation and/or the patch no longer remediates the violation in the software program.

FIG. 2D depicts the software program 240. The software program 240 may be the software program 230 of FIG. 2C after application of a patch, the patch being the same as the patch applied in FIG. 2B. After application of the patch, the software program 240 may no longer include the violation that is present in the software program 230 of FIG. 2C.

FIG. 2E depicts a simplified software program 250 as it may appear after completion of the simplification process. In some embodiments, the simplified software program 250 may correspond with the software program 172 of the example 170 of FIG. 1. The simplification process may also include normalizing function names, method names, class names, etc. For example, when compared to the software program 210 of FIG. 2A and/or the software program 230 of FIG. 2C, the software program 250 may include normalized names. For example, the class "TtlMapState" may be renamed "Example". Similarly, the method putAll may be renamed "example" and various variables in the software program may be renamed. For example, the variables "UK" and "UV" may be renamed "Object" and "Object". In a similar manner, the method stub may be renamed from "methodStub1" to "doSomething" and the input variables to the method may be changed to variables of the "Object" type named "object1" and "object2". As with previous transformations of the elements of the software program, the device may verify that the simplified software program 250 has the violation and the violation is remediated by the patch. When compared with the original software program 210, the software program 250 may be simpler to read and understand because one or more extraneous elements have been deleted and one or more variables have been renamed.

FIG. 2F depicts the software program 260. The software program 260 may be the software program 250 of FIG. 2E after application of a patch, the patch being the same as the patch applied in FIGS. 2B and 2D. After application of the patch, the software program 260 may no longer include the violation that is present in the software program 250 of FIG. 2E. In some embodiments, the device may also perform a normalization of variables in the patch. For example, when compared with the patches in FIGS. 2B and 2D, the patch in FIG. 2F may include a normalized name for the variable "UV" to "Object" as was performed for the software program 250 of FIG. 2E.

The simplification process and software programs depicted in FIGS. 2A-2F are provided as examples. A device may simplify a software program in alternative ways and software programs may be written in different programming languages, include different lines of code, and/or include different extraneous elements.

Figure 3:
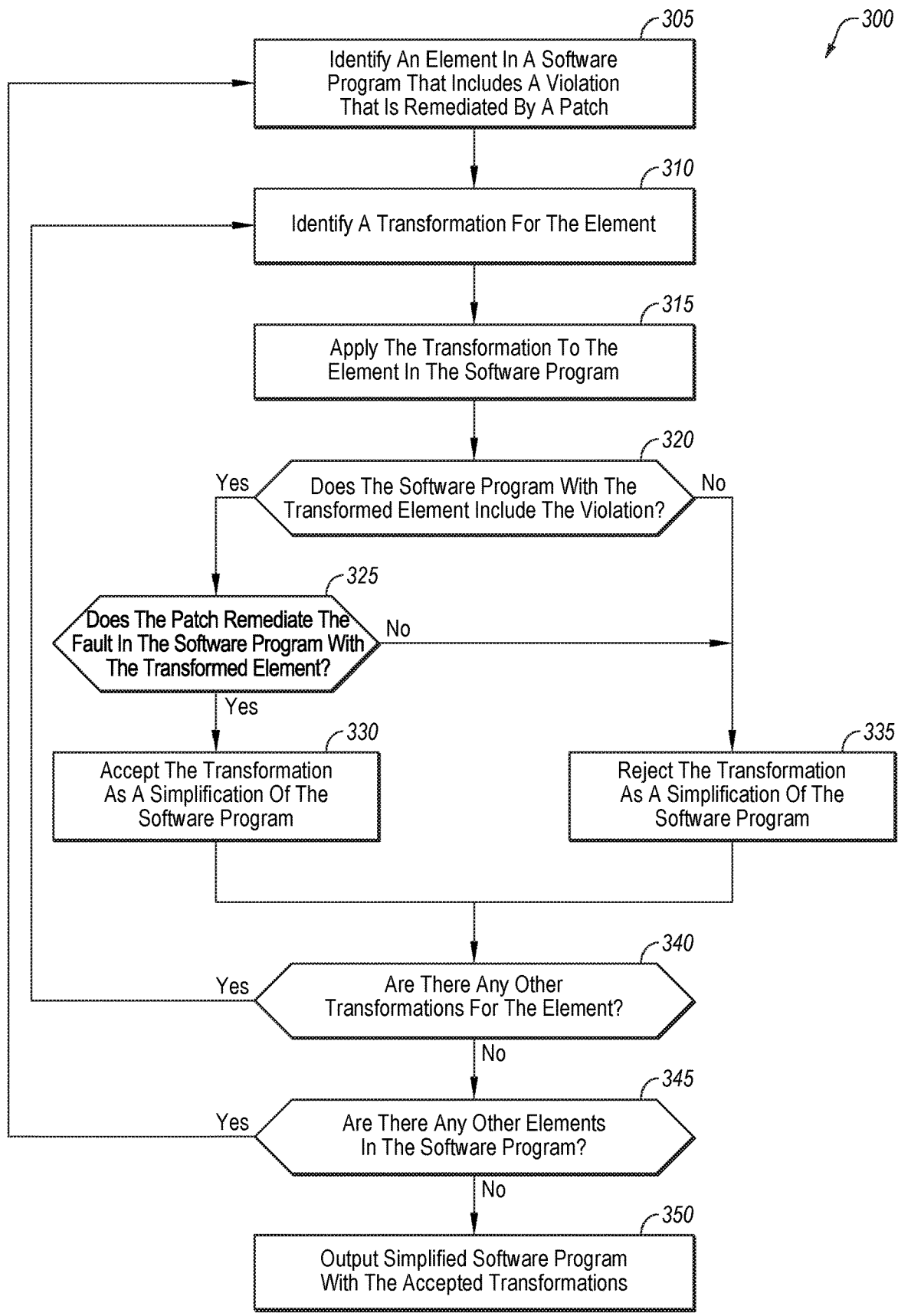
FIG. 3 is a flowchart of an example method of simplifying a software program.

FIG. 3 is a flowchart of an example method 300 of simplifying a software program. The method 300 may be arranged in accordance with at least one embodiment described in the present disclosure. The method 300 may be performed, in whole or in part, in some embodiments, by a system and/or environment, such as the environment 100 and/or the computer system 502 of FIGS. 1 and 5, respectively. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

At block 305, an element may be identified in a software program that includes a violation that is remediated by a patch. In some embodiments, the element may include a line of code, a part of a line of code, a variable name, a method name, a class name, etc.

At block 310, a transformation for the element may be identified. In some embodiments, transformations may include alterations to class definitions such as removing a class definition, removing a declaration within a class, removing an annotation in a class, replacing a class with a stub class, among other alterations; alterations to method definitions such as removing a method definition, removing a parameter in a method, removing a declaration in a method, removing an annotation in a method, replacing a method with a stub method, among other alterations; alterations to statements such as removing a statement, replacing a method call with a stub method, removing a loop statement while maintaining a body of the statement, removing a conditional statement while maintaining a body of the statement, among other alterations; and alterations to expressions such as replacing an expression with a constant, removing a term from an expression, among other alterations. In some embodiments, the transformations may include normalization of types such as replacing a type with a generic type, replacing a type with a super type, among other alterations; normalization of variable names such as deriving a variable name from its type, generating a natural name for a variable from its surrounding context, among other alterations; normalization of class and method names such as using a generic name such as "Example" and "example( )"; and normalization of stub class and stub method names such as using a generic name such as "SomeClass" or "doSomething( )".

At block 315 the transformation may be applied to the element in the software program. At decision block 320, it may be determined whether the software program with the transformed element includes the violation. For example, in some embodiments, applying the transformation to the element may result in the software program not including the violation. In response to determining that the software program with the transformed element does not include the violation ("No" at decision block 320), the method 300 may proceed to block 335. In response to determining that the software program with the transformed element does include the violation ("Yes" at decision block 320), the method 300 may proceed to decision block 325.

At decision block 325, it may be determined whether the patch remediates the fault in the software program with the transformed element. For example, in some embodiments, applying the transformation to the element may result in the patch no longer remediating the violation in the software program. In response to determining that the patch does not remediate the fault in the software program with the transformed element ("No" at decision block 325), the method 300 may proceed to block 335. In response to determining that the patch does remediate the fault in the software program with the transformed element ("Yes" at decision block 325), the method 300 may proceed to block 330.

At block 330, the transformation may be accepted as a simplification of the software program. At block 335, the transformation may be rejected as a simplification of the software program. The method 300 may proceed from both block 330 and from block 335 to decision block 340.

At decision block 340, it may be determined whether there are any other transformations for the element. In response to determining that there are other transformations for the element ("Yes" at decision block 340), the method 300 may return to block 310 and a new transformation may be identified. In response to determining that there are no other transformations for the element ("No" at decision block 340), the method 300 may proceed to decision block 345.

At decision block 345, it may be determined whether there are any other elements in the software program. In response to determining that there are other elements in the software program ("Yes" at decision block 345), the method 300 may return to block 305 and a new element may be identified. In response to determining that there are no other elements in the software program ("No" at decision block 345), the method 300 may proceed to block 350.

At block 350, the simplified software program with the accepted transformations may be outputted.

Modifications, additions, or omissions may be made to FIG. 3 without departing from the scope of the present disclosure. For example, the method 300 may include more or fewer elements than those illustrated and described in the present disclosure. In some embodiments, transformations and/or elements may be ranked and/or prioritized. For example, in some embodiments, deletions may be prioritized over other alterations. By prioritizing deletions, the method 300 may be more efficient because it may not be helpful to examine other alterations if a deletion is accepted as a simplification of the software program.

Alternatively or additionally, in some embodiments, the elements of the software program may be identified in a particular order. For example, the method 300 may identify elements beginning from the beginning of the software program and proceeding to an end of the software program. Alternatively or additionally, in some embodiments, the method 300 may identify elements of the software program beginning at the end of the software program and proceeding to the beginning of the software program. Alternatively or additionally, in some embodiments the method 300 may randomly identify elements of the software program.

Figure 4:
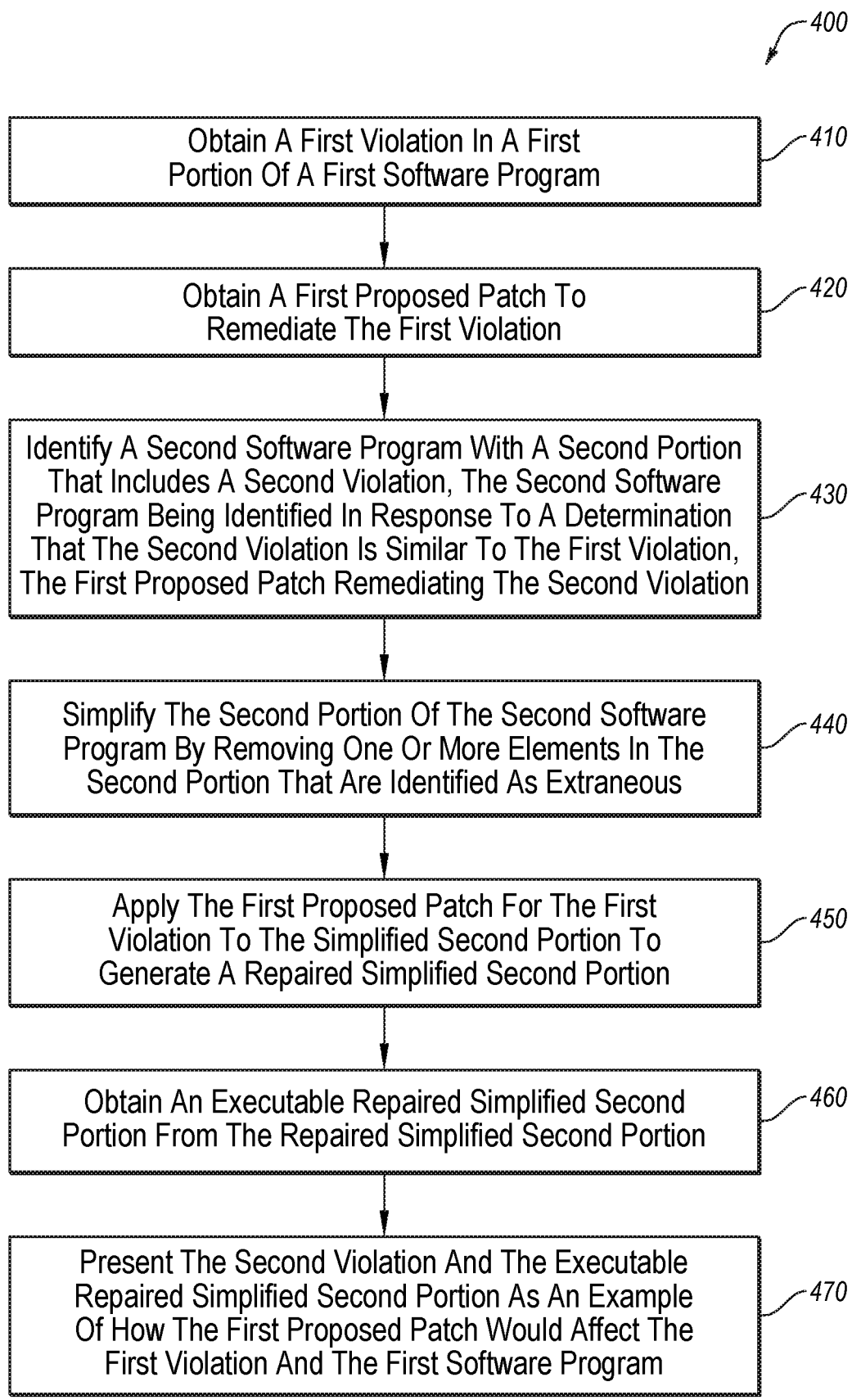
FIG. 4 is a flowchart of an example method of generating an explanatory and executable repair example.

FIG. 4 is a flowchart of an example method 400 of generating an explanatory and executable repair example.

The method 400 may be arranged in accordance with at least one embodiment described in the present disclosure. The method 400 may be performed, in whole or in part, in some embodiments, by a system and/or environment, such as the environment 100 and/or the computer system 502 of FIGS. 1 and 5, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may being at block 410, where a first violation in a first portion of a first software program may be obtained. In block 420, a first proposed patch to remediate the first violation may be obtained.

In block 430, a second software program with a second portion that includes a second violation may be identified. The second software program may be identified in response to a determination that the second violation is similar to the first violation. The first proposed patch may remediate the second violation.

In block 440, the second portion of the second software program may be simplified by removing one or more elements in the second portion that are identified as extraneous. In some embodiments, an element may be identified as extraneous based on the second portion retaining the second violation after removal of the element. In some embodiments, the element may be identified as extraneous if, in addition to retaining the second violation, the second violation is remediated by the first proposed patch when applied to the second portion after removal of the element. In some embodiments, the second portion may be simplified by using one or more operations of the method 300 of FIG. 3 discussed above.

For example, in some embodiments, a first transformation of a first element of the second portion may be generated. The first transformation may be applied to the first element. It may be verified that the second portion with the first transformation includes the second violation. In response to verifying the second portion with the first transformation includes the second violation, it may be verified that the first proposed patch remediates the second violation in the second portion with the first transformation. In response to verifying the first proposed patch remediates the second violation in the second portion, the first transformation may be maintained as a simplification of the second portion. A second transformation of a second element of the second portion may be generated. The second transformation may be applied to the second element. It may be determined that the second portion with the second transformation does not include the second violation. In response to determining the second portion with the second transformation does not include the second violation, the second transformation may be rejected as a simplification of the second portion. A third transformation of a third element of the second portion may be generated. The third transformation may be applied to the third element. It may be verified that the second portion with the third transformation includes the second violation. In response to verifying the second portion with the third transformation includes the second violation, it may be determined that the first proposed patch fails to remediate the second violation in the second portion with the third transformation. In response to determining the first proposed patch fails to remediate the second violation in the second portion with the third transformation, the third transformation may be rejected as a simplification of the second portion.

In some embodiments, the second portion may include multiple lines of code and multiple variables. In these and other embodiments, simplifying the second portion may include identifying a line of code of the multiple lines of code as an extraneous line of code. The extraneous line of code may be removed. It may be verified that the second portion without the extraneous line of code includes the second violation. It may be verified that the first proposed patch remediates the second violation in the second portion without the extraneous line of code. A variable of the multiple variables may be identified as renamable. The renamable variable may be renamed. It may be verified that the second portion with the renamed renamable variable includes the second violation. It may be verified that the first proposed patch remediates the second violation in the second portion with the renamed renamable variable. A simplified second portion may be obtained based on the second portion, the removed extraneous line of code, and the renamed renamable variable. In some embodiments, the second portion may further include multiple classes and multiple methods and simplifying the second portion may further include identifying a class of the multiple classes as a stub candidate class. A stub class may be generated for the stub candidate class. It may be verified that the second portion with the stub class includes the second violation. It may be verified that the first proposed patch remediates the second violation in the second portion with the stub class. A method of the multiple methods may be identified as a stub candidate method. A stub method may be generated for the stub candidate method. It may be verified that the second portion with the stub method includes the second violation. It may be verified that the first proposed patch remediates the second violation in the second portion with the stub method. The simplified second portion may be further based on the generated stub class and the generated stub method.

In block 450, the first proposed patch for the first violation may be applied to the simplified second portion to generate a repaired simplified second portion. In block 460, an executable repaired simplified second portion may be obtained from the repaired simplified second portion. In block 470, the second violation and the executable repaired simplified second portion may be presented as an example of how the first proposed patch would affect the first violation and the first software program.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

Figure 5:
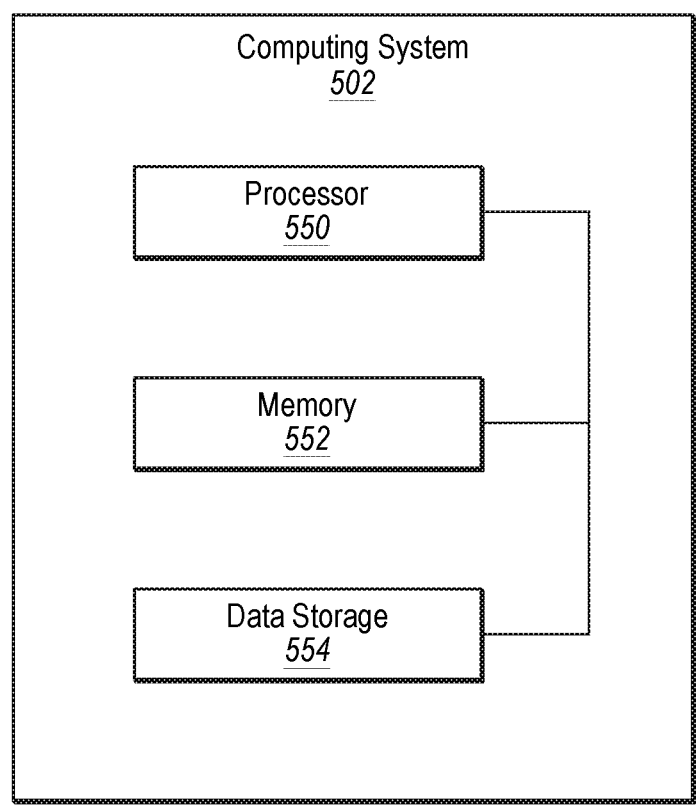
FIG. 5 illustrates an example computing system that may be configured to generate an explanatory and executable repair example.

FIG. 5 illustrates a block diagram of an example computing system 502, according to at least one embodiment of the present disclosure. The computing system 502 may be configured to implement or direct one or more operations associated generating explanatory and executable repair examples. The computing system 502 may include a processor 550, a memory 552, and a data storage 554. The processor 550, the memory 552, and the data storage 554 may be communicatively coupled.

In general, the processor 550 may include any suitable special-purpose or general-purpose computer, computing entity, or processing device including various computer hardware or software modules and may be configured to execute instructions stored on any applicable computer-readable storage media. For example, the processor 550 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, the processor 550 may include any number of processors configured to, individually or collectively, perform or direct performance of any number of operations described in the present disclosure. Additionally, one or more of the processors may be present on one or more different electronic devices, such as different servers.

In some embodiments, the processor 550 may be configured to interpret and/or execute program instructions and/or process data stored in the memory 552, the data storage 554, or the memory 552 and the data storage 554. In some embodiments, the processor 550 may fetch program instructions from the data storage 554 and load the program instructions in the memory 552. After the program instructions are loaded into memory 552, the processor 550 may execute the program instructions.

For example, in some embodiments, the methods 300 of FIG. 3 and/or 400 of FIG. 4 may be included in the data storage 554 as program instructions. The processor 550 may fetch the program instructions of the methods from the data storage 554 and may load the program instructions of the methods in the memory 552. After the program instructions of the methods are loaded into memory 552, the processor 550 may execute the program instructions such that the computing system may implement the operations associated with the methods as directed by the instructions.

The memory 552 and the data storage 554 may include computer-readable storage media for carrying or having computer-executable instructions or data structures stored thereon. Such computer-readable storage media may include any available media that may be accessed by a general-purpose or special-purpose computer, such as the processor 550. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 550 to perform a certain operation or group of operations.

Modifications, additions, or omissions may be made to the computing system 502 without departing from the scope of the present disclosure. For example, in some embodiments, the computing system 502 may include any number of other components that may not be explicitly illustrated or described.

As may be understood, generating explanatory and executable repair examples as discussed above may be used as a means for improving software programming and/or reducing the time to develop software programs. Hence, the systems and methods described herein provide the ability to correct violations in software programs and, in some instances, reduce the development time for developing software programs.

As indicated above, the embodiments described in the present disclosure may include the use of a special purpose or general purpose computer (e.g., the processor 550 of FIG. 5) including various computer hardware or software modules, as discussed in greater detail below. Further, as indicated above, embodiments described in the present disclosure may be implemented using computer-readable media (e.g., the memory 552 or data storage 554 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a first violation in a first portion of a first software program;
   obtaining a first proposed patch to remediate the first violation;
   identifying a second software program with a second portion that includes a second violation, the second software program being identified in response to a determination that the second violation is similar to the first violation, the first proposed patch remediating the second violation;
   simplifying the second portion of the second software program by removing one or more elements in the second portion of the second software program that are identified as extraneous;
   applying the first proposed patch for the first violation to the simplified second portion of the second software program to generate a repaired simplified second portion of the second software program;
   obtaining an executable repaired simplified second portion from the repaired simplified second portion of the second software program; and
   presenting the second violation and the executable repaired simplified second portion of the second software program as an example of how the first proposed patch would affect the first violation and the first software program.

2. The method of claim 1, wherein simplifying the second portion of the second software program comprises:
   generating a first transformation of a first element of the second portion of the second software program;
   applying the first transformation to the first element of the second portion of the second software program;
   verifying the second portion of the second software program with the first transformation includes the second violation;
   in response to verifying the second portion of the second software program with the first transformation includes the second violation, verifying the first proposed patch remediates the second violation in the second portion of the second software program with the first transformation; and
   in response to verifying the first proposed patch remediates the second violation in the second portion of the second software program, maintaining the first transformation as a simplification of the second portion of the second software program.

3. The method of claim 2 wherein simplifying the second portion of the second software program further comprises:
   generating a second transformation of a second element of the second portion of the second software program;
   applying the second transformation to the second element of the second portion of the second software program;
   determining the second portion of the second software program with the second transformation does not include the second violation; and
   in response to determining the second portion of the second software program with the second transformation does not include the second violation, rejecting the second transformation as a simplification of the second portion of the second software program.

4. The method of claim 2 wherein simplifying the second portion of the second software program further comprises:
   generating a third transformation of a third element of the second portion of the second software program;
   applying the third transformation to the third element of the second portion of the second software program;
   verifying the second portion of the second software program with the third transformation includes the second violation;
   in response to verifying the second portion of the second software program with the third transformation includes the second violation, determining the first proposed patch fails to remediate the second violation in the second portion of the second software program with the third transformation; and
   in response to determining the first proposed patch fails to remediate the second violation in the second portion of the second software program with the third transformation, rejecting the third transformation as a simplification of the second portion of the second software program.

5. The method of claim 1, wherein the second portion of the second software program includes a plurality of lines of code and a plurality of variables, and wherein the simplifying the second portion of the second software program comprises:
   identifying a line of code of the plurality of lines of code as an extraneous line of code;
   removing the extraneous line of code;
   verifying the second portion of the second software program without the extraneous line of code includes the second violation;
   verifying the first proposed patch remediates the second violation in the second portion of the second software program without the extraneous line of code;
   identifying a variable of the plurality of variables as a renamable variable;
   renaming the renamable variable;
   verifying the second portion of the second software program with the renamed renamable variable includes the second violation;
   verifying the first proposed patch remediates the second violation in the second portion of the second software program with the renamed renamable variable; and
   obtaining a simplified second portion of the second software program based on the second portion of the second software program, the removed extraneous line of code, and the renamed renamable variable.

6. The method of claim 5, wherein the second portion of the second software program further includes a plurality of classes and a plurality of methods, and wherein the simplifying the second portion of the second software program further comprises:
- identifying a class of the plurality of classes as a stub candidate class;
- generating a stub class for the stub candidate class;
- verifying the second portion of the second software program with the stub class includes the second violation;
- verifying the first proposed patch remediates the second violation in the second portion of the second software program with the stub class;
- identifying a method of the plurality of methods as a stub candidate method;
- generating a stub method for the stub candidate method;
- verifying the second portion of the second software program with the stub method includes the violation; and
- verifying the first proposed patch remediates the second violation in the second portion of the second software program with the stub method,
- wherein the obtaining the simplified second portion of the second software program is further based on the generated stub class and the generated stub method.

7. At least one non-transitory computer-readable medium configured to store one or more instructions that, in response to being executed by at least one system, cause the at least one system to perform the method of claim 1.

8. A method comprising:
- obtaining a first violation in a first software program;
- obtaining a first proposed patch to remediate the first violation;
- identifying a second software program with a second violation similar to the first violation, the first proposed patch remediating the second violation;
- simplifying the second software program by identifying and removing one or more extraneous elements in the second software program;
- applying the first proposed patch for the first violation to the simplified second software program to generate a repaired simplified second software program;
- obtaining an executable repaired simplified second software program from the repaired simplified second software program;
- presenting the second violation and the executable repaired simplified second software program as an example of how the first proposed patch would affect the first violation and the first software program; and
- performing one or more repair operations with respect to the first violation based on the first proposed patch.

9. The method of claim 8, wherein simplifying the second software program comprises:
- generating a first transformation of the second software program;
- applying the first transformation to the second software program;
- verifying the second software program with the first transformation includes the second violation;
- in response to verifying the second software program with the first transformation includes the second violation, verifying the first proposed patch remediates the second software violation in the second software program with the first transformation; and
- in response to verifying the first proposed patch remediates the second software violation in the second software program, maintaining the first transformation as a simplification of the second software program.

10. The method of claim 9 wherein simplifying the second software program further comprises:
- generating a second transformation of the second software program;
- applying the second transformation to the second software program;
- determining the second software program with the second transformation does not include the second violation; and
- in response to determining the second software program with the second transformation does not include the second violation, rejecting the second transformation as a simplification of the second software program.

11. The method of claim 9 wherein simplifying the second software program further comprises:
- generating a third transformation of the second software program;
- applying the third transformation to the second software program;
- verifying the second software program with the third transformation includes the second violation;
- in response to verifying the second software program with the third transformation includes the second violation, determining the first proposed patch fails to remediate the second software violation in the second software program with the third transformation; and
- in response to determining the first proposed patch fails to remediate the second software program with the third transformation, rejecting the third transformation as a simplification of the second software program.

12. The method of claim 8, wherein the second software program includes a plurality of lines of code and a plurality of variables, and wherein the simplifying the second software program comprises:
- identifying a line of code of the plurality of lines of code as an extraneous line of code;
- removing the extraneous line of code;
- verifying the second software program without the extraneous line of code includes the second violation;
- verifying the first proposed patch remediates the second violation in the second software program without the extraneous line of code;
- identifying a variable of the plurality of variables as a renamable variable;
- renaming the renamable variable;
- verifying the second software program with the renamed renamable variable includes the second violation;
- verifying the first proposed patch remediates the second violation in the second software program with the renamed renamable variable; and
- obtaining a simplified second software program based on the second software program, the removed extraneous line of code and the renamed renamable variable.

13. The method of claim 12, wherein the second software program further includes a plurality of classes and a plurality of methods, and wherein the simplifying the second software program further comprises:
- identifying a class of the plurality of classes as a stub candidate class;
- generating a stub class for the stub candidate class;
- verifying the second software program with the stub class includes the second violation;
- verifying the first proposed patch remediates the second violation in the second software program with the stub class;

identifying a method of the plurality of methods as a stub candidate method;
generating a stub method for the stub candidate method;
verifying the second software program with the stub method includes the violation; and
verifying the first proposed patch remediates the second violation in the second software program with the stub method,
wherein the obtaining the simplified second software program is further based on the generated stub class and the generated stub method.

14. At least one non-transitory computer-readable medium configured to store one or more instructions that, in response to being executed by at least one system, cause the at least one system to perform the method of claim 8.

15. A method comprising:
obtaining a software program, the software program including a plurality of lines of code and a plurality of variables;
identifying a violation in the software program;
obtaining a proposed patch to remediate the violation;
identifying a line of code of the plurality of lines of code as an extraneous line of code;
removing the extraneous line of code;
verifying the software program without the extraneous line of code includes the violation;
verifying the proposed patch remediates the violation in the software program without the extraneous line of code;
identifying a variable of the plurality of variables as a renamable variable;
renaming the renamable variable;
verifying the software program without the extraneous line of code and with the renamed renamable variable includes the violation;
verifying the proposed patch remediates the violation in the software program without the extraneous line of code and with the renamed renamable variable; and
obtaining a simplified software program based on the software program, the removed extraneous line of code, and the renamed renamable variable.

16. The method of claim 15, wherein the software program further includes a plurality of classes, further comprising:
identifying a class of the plurality of classes as a stub candidate class; generating a stub class for the stub candidate class;
verifying the software program without the extraneous line of code, with the renamed renamable variable, and with the stub class includes the violation; and
verifying the proposed patch remediates the violation in the software program without the extraneous line of code, with the renamed renamable variable, and with the stub class,
wherein the obtaining the simplified software program is further based on the generated stub class.

17. The method of claim 16, wherein the software program further includes a plurality of methods, further comprising:
identifying a method of the plurality of methods as a stub candidate method;
generating a stub method for the stub candidate method;
verifying the software program without the extraneous line of code, with the renamed renamable variable, with the stub class, and with the stub method includes the violation; and
verifying the proposed patch remediates the violation in the software program without the extraneous line of code, with the renamed renamable variable, with the stub class, and with the stub method,
wherein the obtaining the simplified software program is further based on the generated stub method.

18. The method of claim 15, wherein the software program further includes a plurality of methods, further comprising:
identifying a method of the plurality of methods as a stub candidate method;
generating a stub method for the stub candidate method;
verifying the software program without the extraneous line of code, with the renamed renamable variable, and with the stub method includes the violation; and
verifying the proposed patch remediates the violation in the software program without the extraneous line of code, with the renamed renamable variable, and with the stub method, wherein the obtaining the simplified software program is further based on the generated stub method.

19. At least one non-transitory computer-readable medium configured to store one or more instructions that, in response to being executed by at least one system, cause the at least one system to perform the method of claim 15.

* * * * *